(12) United States Patent
Gebert et al.

(10) Patent No.: US 9,771,069 B2
(45) Date of Patent: Sep. 26, 2017

(54) METHOD AND DEVICE FOR THE FORWARD PARKING OF A MOTOR VEHICLE INTO A PERPENDICULAR PARKING SPACE

(71) Applicant: VOLKSWAGEN AG, Wolfsburg (DE)

(72) Inventors: Hermann Gebert, Berlin (DE); Mehmet Terkes, Braunschweig (DE); Torsten Wendler, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 14/764,456

(22) PCT Filed: Jan. 27, 2014

(86) PCT No.: PCT/EP2014/051499
§ 371 (c)(1),
(2) Date: Jul. 29, 2015

(87) PCT Pub. No.: WO2014/122040
PCT Pub. Date: Aug. 14, 2014

(65) Prior Publication Data
US 2015/0375742 A1    Dec. 31, 2015

(30) Foreign Application Priority Data
Feb. 8, 2013 (DE) .................. 10 2013 002 283

(51) Int. Cl.
*B60W 30/06* (2006.01)
*B62D 15/02* (2006.01)
*G08G 1/16* (2006.01)

(52) U.S. Cl.
CPC .......... *B60W 30/06* (2013.01); *B62D 15/027* (2013.01); *G08G 1/168* (2013.01); *B60W 2550/10* (2013.01)

(58) Field of Classification Search
CPC . B60W 30/06; B60W 2550/10; B62D 15/027; B62D 15/0285; G08G 1/168
See application file for complete search history.

(56) References Cited

U.S. PATENT DOCUMENTS

| | | | |
|---|---|---|---|
| 9,193,387 B2* | 11/2015 | Auer | B62D 15/0265 |
| 2006/0069478 A1* | 3/2006 | Iwama | B62D 15/0245 701/36 |

(Continued)

FOREIGN PATENT DOCUMENTS

| | | |
|---|---|---|
| CN | 101346271 A | 1/2009 |
| CN | 102066186 A | 5/2011 |

(Continued)

OTHER PUBLICATIONS

Search Report for German Patent Application No. 10 2013 002 283.5; dated Sep. 26, 2013.

(Continued)

*Primary Examiner* — Nicholas Kiswanto
*Assistant Examiner* — Tamara Weber
(74) *Attorney, Agent, or Firm* — Barnes & Thornburg LLP

(57) ABSTRACT

A method and a device for the forward parking of a motor vehicle into a perpendicular parking space, wherein the motor vehicle includes an apparatus for detecting objects in the environment of the motor vehicle. The method includes detecting an object in the environment of the motor vehicle; determining the position of the object in relation to the motor vehicle; selecting a situation-dependent parking strategy as a function of the combination of the position of the object in relation to the motor vehicle and the turn signal position "left", "right", or "neutral" under the assumption of a (Continued)

perpendicular parking space next to the detected object; and performing a parking process on the basis of the situation-dependent parking strategy.

19 Claims, 15 Drawing Sheets

(56) References Cited

U.S. PATENT DOCUMENTS

| | | | | |
|---|---|---|---|---|
| 2006/0115124 | A1* | 6/2006 | Nobori | B60R 1/00 382/104 |
| 2008/0177443 | A1* | 7/2008 | Lee | B62D 15/0285 701/41 |
| 2009/0251334 | A1* | 10/2009 | Yoshihashi | B60W 50/14 340/932.2 |
| 2009/0259365 | A1* | 10/2009 | Rohlfs | B62D 15/028 701/41 |
| 2013/0073119 | A1* | 3/2013 | Huger | B62D 15/027 701/1 |
| 2013/0116879 | A1* | 5/2013 | Huger | B62D 15/0285 701/23 |
| 2013/0162825 | A1* | 6/2013 | Yoon | B60W 30/06 348/148 |

FOREIGN PATENT DOCUMENTS

| | | | | |
|---|---|---|---|---|
| DE | 102005017362 | A1 | 11/2005 | |
| DE | 102007002261 | A1 | 8/2008 | |
| DE | 102008004633 | A1 | 7/2009 | |
| DE | 102009027820 | A1 | 1/2011 | |
| DE | 102009039084 | A1 | 3/2011 | |
| DE | 102009057646 | A1 | 6/2011 | |
| DE | WO 2011076322 | A1 * | 6/2011 | ......... B62D 15/0265 |
| DE | 102010020208 | A1 | 11/2011 | |
| DE | 102010022716 | A1 | 12/2011 | |
| DE | 102010030213 | A1 | 12/2011 | |
| DE | WO 2011151045 | A1 * | 12/2011 | ........... B62D 15/027 |
| DE | 102010040591 | A1 | 3/2012 | |
| DE | 102010043742 | A1 | 6/2012 | |
| DE | 102011003886 | A1 | 8/2012 | |
| JP | 2006096312 | A | 4/2006 | |

OTHER PUBLICATIONS

Search Report for International Patent Application No. PCT/EP2014/051499; dated May 15, 2014.
Chinese Office Action in corresponding application 201480007547.2, dated Jun. 3, 2016.
Office Action for Korean Patent Application No. 10-2015-7023198; dated Feb. 27, 2017.

* cited by examiner

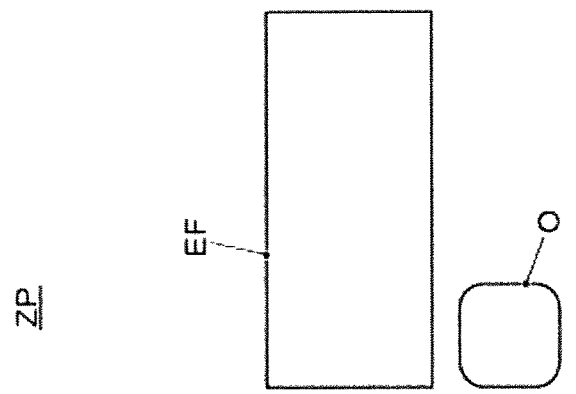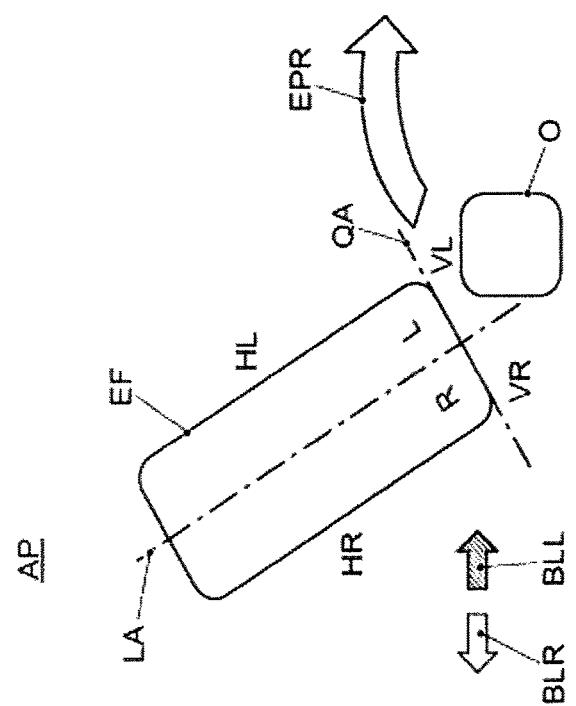
FIG. 5

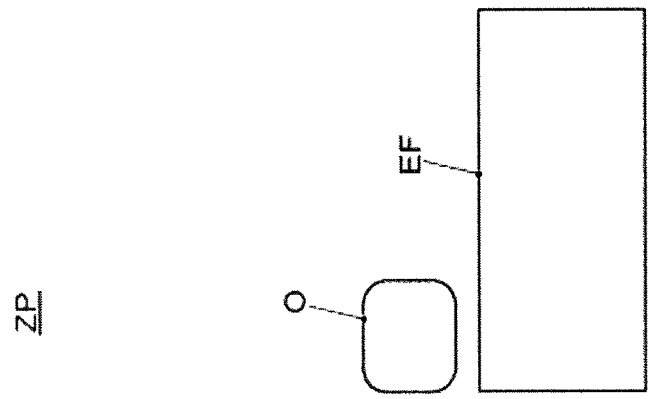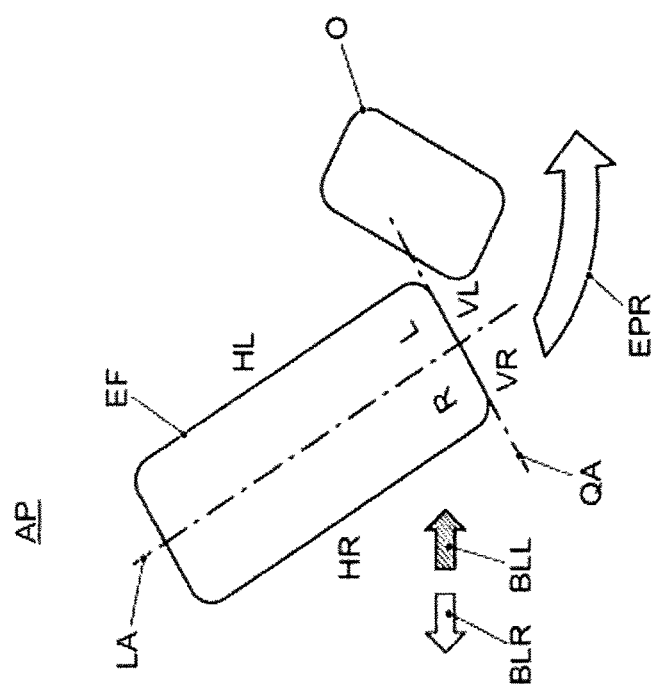
FIG. 10

METHOD AND DEVICE FOR THE FORWARD PARKING OF A MOTOR VEHICLE INTO A PERPENDICULAR PARKING SPACE

PRIORITY CLAIM

This patent application is a U.S. National Phase of International Patent Application No. PCT/EP2014/051499, filed 27 Jan. 2014, which claims priority to German Patent Application No. 10 2013 002 283.5, filed 8 Feb. 2013, the disclosures of which are incorporated herein by reference in their entirety.

SUMMARY

Illustrative embodiments relate to a method for the forward parking of a motor vehicle into a perpendicular parking space.

Illustrative embodiments provide a method and a device for parking into a perpendicular parking space in the forward direction with improved parking success, without the perpendicular parking space having to be known before the start of the assistance.

BRIEF DESCRIPTION OF THE DRAWINGS

Disclosed embodiments will be explained below with reference to the drawings, in which:

FIG. 5 shows the parking strategy for the combination of the right-hand flashing indicator light having been set and an object at the front for parking space without a start;

FIG. 10 shows a second example of prioritization between competing combinations;

DETAILED DESCRIPTION OF THE DISCLOSED EMBODIMENTS

Figure 1:
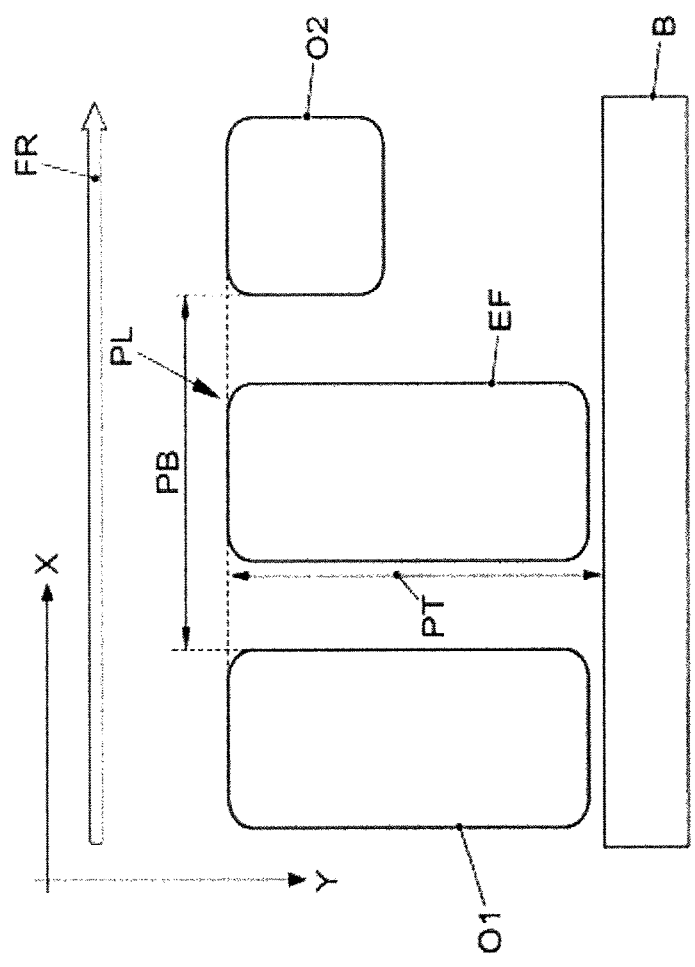
FIG. 1 shows an illustration of the co-ordinate system used.

The method for the forward parking of a motor vehicle into a perpendicular parking space, wherein the motor vehicle has an apparatus for detecting objects in its surroundings, comprises:

detecting an object in the surroundings of the motor vehicle, determining the position of the object relating to the motor vehicle, selecting a situation-related parking strategy as a function of the combination of the position of the object relative to the motor vehicle and the flashing indicator light position "left", "right" or "neutral" assuming a perpendicular parking space next to the detected object, and executing a parking process on the basis of the situation-related parking strategy.

In the method it is assumed that a perpendicular parking space is present next to the detected object. An assisted parking process with a situation-related parking strategy is initiated in conjunction with the position of the object relative to the vehicle and the flashing indicator light position, without the perpendicular parking space having to be initially measured. In this way, forward parking into a perpendicular parking space can be started without previous determination of the perpendicular parking space. In other words, the vehicle approaches an object which is detected by the vehicle. By issuing instructions to the assistance system, the driver determines that parking in the forward direction is to be started from the current position, and the assumed location of the perpendicular parking space is derived from the combination of the position of the object and the flashing indicator light.

The detected object may be evaluated as a start or end of a perpendicular parking space. In this context, the combination of the position of the object relative to the motor vehicle and the flashing indicator light position decides whether the detected object is the start or the end of the assumed perpendicular parking space. In this simple way, the start or the end of the perpendicular parking space is defined, without the position or the precise dimensions of the perpendicular parking space being known.

Continuous detection of the surroundings during the execution of the parking process may take place on the basis of the parking strategy, and the parking process is adapted to the results of the current detection of the surroundings. In this way, the parking process is "adapted" to newly detected situations in the surroundings. The parking process is, as it were, started with a parking hypothesis. In the course of the parking process, this parking hypothesis is continuously adapted to the results of the detection of the surroundings. If a further object is detected, for example the side edge of a parked vehicle bounding the perpendicular parking space, after the first parking hypothesis, that is to say after the initially selected parking strategy, a new parking hypotheses or parking strategy is calculated on the basis of the two detected objects, with the result that the parking process in the forward direction can be brought to a successful end.

In particular, a preset parking strategy is selected if the flashing indicator light position is "neutral". In this way, inadvertent "idling" of the method is avoided if no flashing indicator light is set and in the case of "neutral" flashing indicator light i.e. the non-set flashing indicator light, a preset parking strategy is defined solely based on the position of the detected object relative to the vehicle.

The region of the detection of the surroundings for determining the position of the object may be divided into a predefined number of sectors, with the result that the position of the detected object is classified by means of the sectors. If, for example, the region of the detection of the surroundings is divided into four sectors, as will be described later, classification of the position of the detected object brings about the assignment of the detected object to a sector. This is sufficient, together with the set flashing indicator light position, for the selection of a parking strategy and initiation of an assisted parking attempt.

If a plurality of situation-related parking strategies are possible, priority control between the possible combinations composed of sector classifications of the object and the set flashing indicator light position may be provided. This may be the case if a detected object extends, for example, over a plurality of sectors, and the classification allocates a plurality of sectors to the detected object. It is then possible that a plurality of combinations of sectors assignment and the set flashing indicator light position compete with one another, with the result that, for example it would not be clear whether the detected object is then to be considered as a start or as an end of an assumed perpendicular parking space. Clarity is established through priority control.

The parking process may be aborted if a plausible alignment and orientation of the motor vehicle during the parking process is not possible. As a result it is ensured that the method arrives at a controlled end if no defined perpendicular parking space is found during the course of the parking process. The responsibility for driving is returned to the driver as a result of the aborting of the parking process.

A parking process may be aborted if the change in angle which is passed through by the vehicle longitudinal axis between the starting position and the current position during the parking process is greater than a predefined maximum value, and/or if the distance traveled between the starting position and the current position during the parking process is greater than a predefined maximum value. In addition, during a parking process a minimum distance from an object must not be undershot. If such a minimum distance from a detected object is reached, the parking process is also aborted. This avoids the method continuing to search, as it were, "endlessly" or maneuvering itself into a futile situation if no reasonable perpendicular parking space is found at the location of the assumed perpendicular parking space.

The device, configured to carry out the method for the forward parking of a motor vehicle into a perpendicular parking space as described above, has detection of the surroundings and an assistance apparatus for carrying out an assisted parking process on the basis of a predefined parking strategy.

In addition, the device has:
an apparatus for classifying the position of a detected object in the surroundings of the motor vehicle, and
an apparatus for selecting a parking strategy on the basis of the combination of a classified position of the detected object and a set flashing indicator light position.

By means of the classification apparatus and the selection apparatus it is advantageously possible to park in the forward direction into an assumed perpendicular parking space without the perpendicular parking space being known at the start of the assisted parking process.

The apparatus for selecting a parking strategy may adapt the parking strategy continuously to the current detection of the surroundings on the basis of the continuous detection of the surroundings during the parking process. If, for example, a further object is detected in the surroundings of the motor vehicle during the parking process, an adapted parking strategy may be calculated on the basis of the objects which have already been detected. In this way, the vehicle works its way slowly into the possible parking space without original precise knowledge of the parking space.

FIG. 1 shows the co-ordinate system which is usually used for the "forward parking into a perpendicular space" scenario, wherein the X axis points in the driving direction FR of the travel past a perpendicular parking space PL, and the Y axis points in the direction of the perpendicular parking space PL. In this context, the perpendicular parking space PL does not necessarily have to be arranged in the direction of the Y axis, i.e. arranged perpendicularly with respect to the X axis, but oblique parking spaces are also permissible. The perpendicular parking space PL is formed in the example in FIG. 1 by a first "deep" object O1, a second "non-deep" object O2 and a boundary B, wherein the perpendicular parking space PL is a parking space width PB and a parking space depth PT.

In this context, "deep" object means that the extent is comparable with the depth of the parking space or the length of the vehicle, while "non-deep" means that the extent of the object is significantly less that the depth of the parking space or the length of the vehicle.

In addition, in FIG. 1 and the following examples the driving direction FR runs from left to right, and parking occurs on the right-hand side, unless specified otherwise. It is obvious that this restriction is only to be understood as exemplary here. Identical considerations apply for left-hand drive traffic or for parking in perpendicular parking spaces on the opposite side of the roadway.

Figure 2:
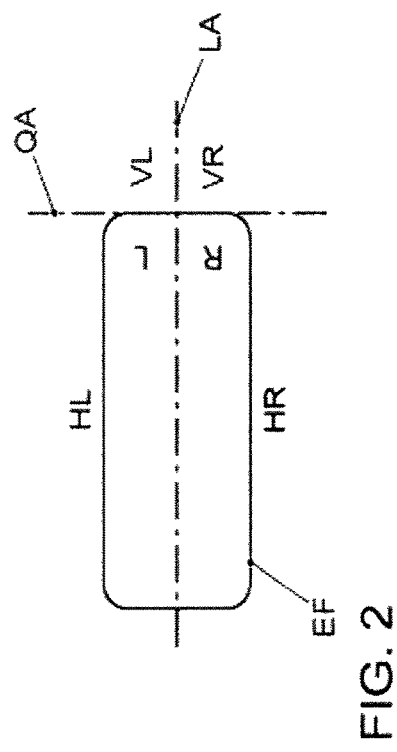
FIG. 2 shows a definition of the used sectors for classifying the position of an object.

FIG. 2 shows the outline of the vehicle in question EF which is to be parked, wherein by means of the vehicle longitudinal axis LA, a distinction is made between a right-hand vehicle side R and a left-hand vehicle side L. The front transverse axis QA, which runs along the front of the vehicle in question, runs perpendicularly with respect to the vehicle longitudinal axis LA. By means of these two axes LA, QA, four sectors are defined which form the detection range of the surroundings sensors (not illustrated) of the vehicle in question EF for the parking process in the forward direction. These sectors are a front left-hand sector VL, a front right-hand sector VR, a rear left-hand sector HL and a right-hand rear sector HR.

All the positions of the vehicle in question EF in which an object is located in the detection range of the surrounding sensors are permitted as an initial position, wherein the detection range comprises the four sectors VL, VR, HL HR explained above. Depending on the position of the detected objects, their relationship with the vehicle in question EF and the state of the flashing indicator light which has been set, a situation-related parking strategy is selected. The flashing indicator light has in principle three states, specifically the neutral state, i.e. the flashing indicator light is not set, and the two states of the set flashing indicator light, specifically left-hand flashing indicator light set and right-hand flashing indicator light set. The two states of the set flashing indicator light, that is to say the left-hand flashing indicator light set and right-hand flashing indicator light set are of interest for the situation-related parking strategy. These flashing indicator light states are represented in the following FIGS. 3 to 10 as arrows with the references BLR for "right-hand flashing indicator light set" and BLL for "left-hand flashing indicator light set", wherein the set flashing indicator light can be recognized in the specified figures by means of the hatching. If the driver has not set a flashing indicator light, the flashing indicator light is therefore in the neutral state, and if the driver nevertheless activates the assistance system a preset parking strategy is used.

According to the fundamental definition of the co-ordinate system and the four sectors VL, HL, VR, HR of the detection range of the vehicle in question EF, exemplary situations of sector/flashing indicator light combinations are dealt with in FIGS. 3 to 6, in which it is assumed at the start of the parking situation which is the initial position AP on the left-hand side of the figures, that the parking situation is a parking space without a start, and that a parking space is free in the set flashing indicator light direction. The parking process is initially started "blind" after the detection of an object in a sector and the initiation of the parking process by the driver, and the vehicle attempts to position itself in the flashing indicator light direction next to the detected object. In the course of the parking process, continuous measurement of the surroundings takes place and the assistance system reacts to the new surroundings. The alignment and orientation of the vehicle is adapted to the new situation. The intended target position ZP is illustrated on the right-hand side in the specified figures. In this context, a parking space without end means that the detected object is considered to be a start of a possible perpendicular parking space whose end is not known at the beginning. A parking space without a start means analogously that the detected object is considered to be an end of a possible perpendicular parking space whose start is not known at the beginning.

Figure 3:
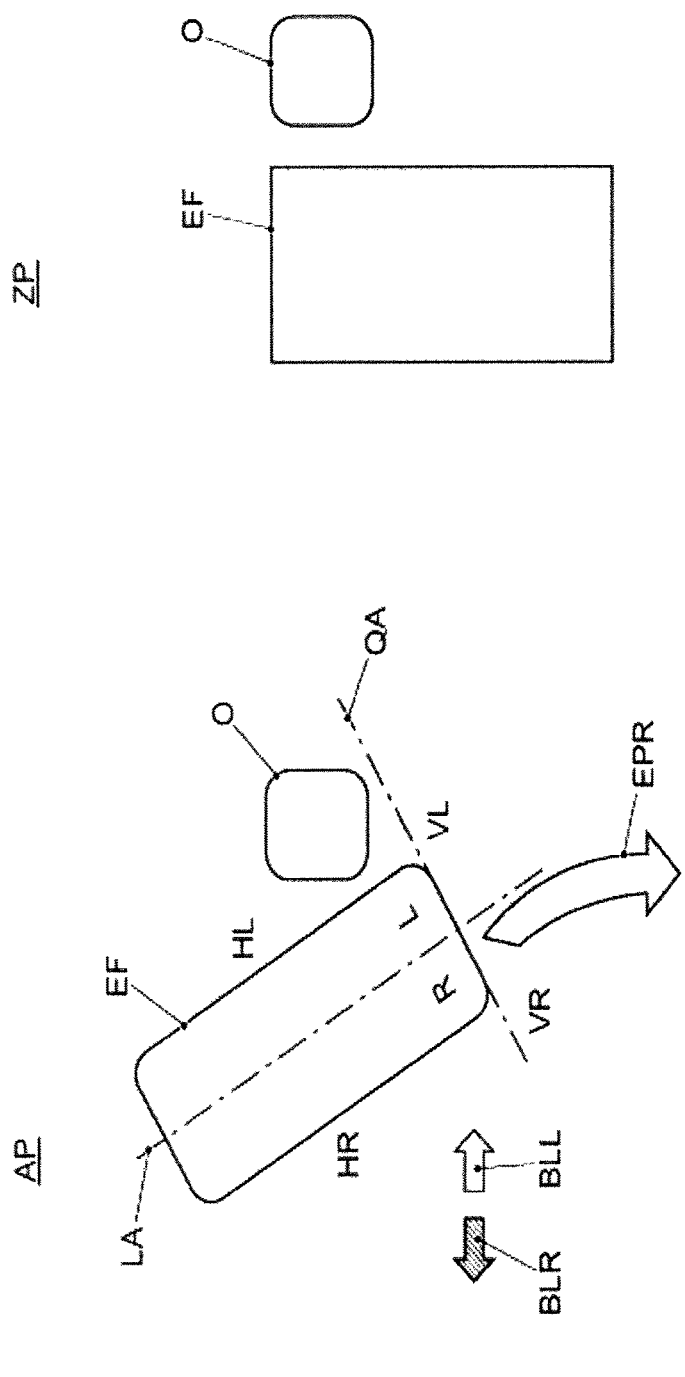
FIG. 3 shows the parking strategy for the combination of the left-hand flashing indicator light having been set and an object on the left and to the rear for a parking space without a start.

FIG. 3 shows a vehicle in question EF, in the rear left-hand sector HL of which an object O is arranged. In other words the driver of the vehicle in question EF has maneuvered the vehicle into the left-hand initial position in which the detection of the surroundings detects an object in the rear left-hand sector HL. In this initial position, the driver sets the right-hand flashing indicator light BLR and activates the parking assistant which considers the object O which is found to be an end of a perpendicular parking space owing to the combination of "object detected in the rear left-hand sector HL and right-hand flashing indicator light set BLR", and attempts to align the vehicle in question to the right next to the object O, which is represented by the projected parking direction EPR which is represented by an arrow. In other words, the perpendicular parking space is supposed to be on the right next to the object O. This is represented in the right-hand part of FIG. 3, which part shows the vehicle in question EF in the desired target position, next to the object O. The illustrated alignment, i.e. the depth alignment, the center alignment and orientation of the vehicle in question EF, takes place in a situation-related fashion on the basis of the continuous detection of the surroundings. If a plausible alignment and orientation are not possible, the assisted parking process is aborted.

Figure 4:
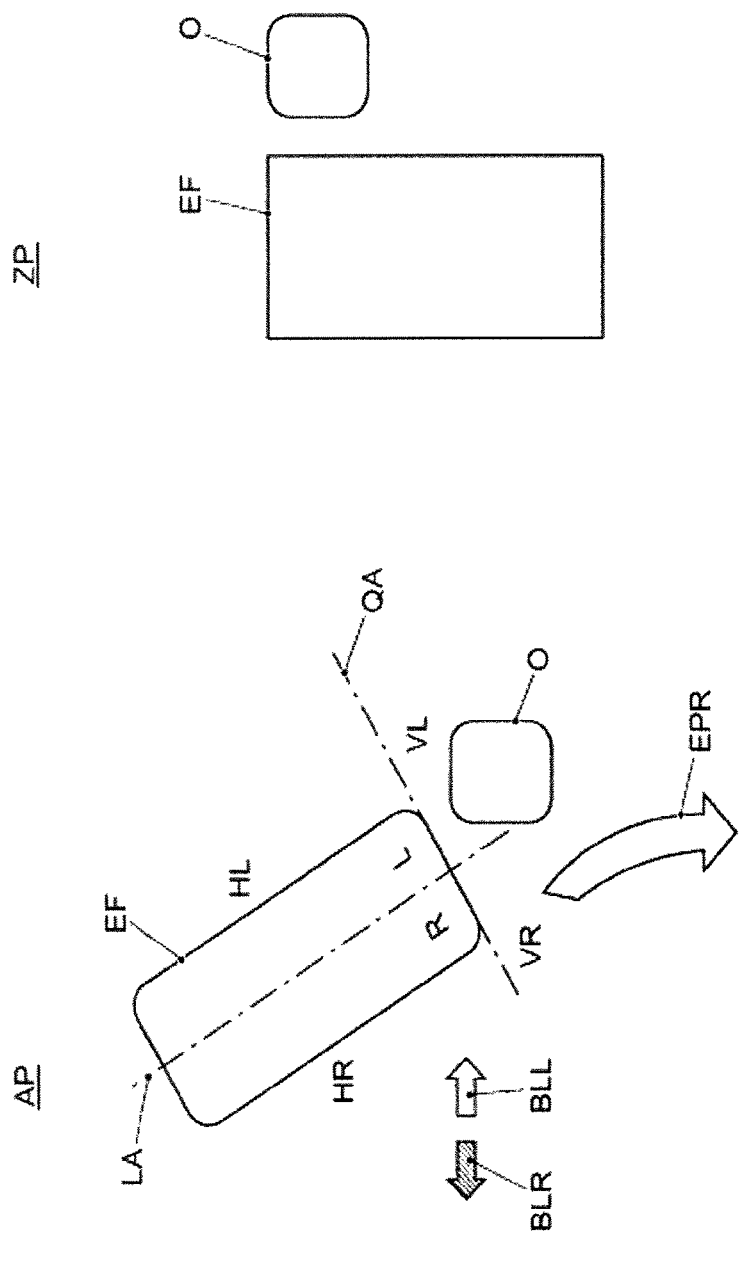
FIG. 4 shows the parking strategy for the combination of the left-hand flashing indicator light having been set and an object at the front for a parking space without a start.

FIG. 4 shows the situation in which the detected object O is located exclusively in a front sector or in both front sectors and the right-hand flashing indicator light is set. In the exemplary case here, the object O is located both in the front left-hand sector VL and in the front right-hand sector VR. The flashing indicator light BLR is set to the right, which is apparent through the highlighted direction arrow. Therefore, the case deals with both the combination of "right-hand flashing indicator light set and object detected in the front left-hand sector" as well as the combination of "right-hand flashing indicator light set and object detected in the front right-hand sector", wherein the object O is evaluated as the end of a parking space. The direction arrow EPR shows the direction in which the assistance system assumes the perpendicular parking space and in which the parking process is initiated. The right-hand part of FIG. 4 shows the intended situation after a successful parking process, in which the vehicle in question is located on the right next to the object. It is also the case here that the alignment and orientation of the vehicle in question EF occur in a situation-related fashion on the basis of the continuous detection of the surroundings during the parking process.

FIG. 5 corresponds to the situation in FIG. 4 with respect to the arrangement of the object O, where the driver in the situation in FIG. 5 signals to the assistance system, by setting the left-hand flashing indicator light BLL, that the parking direction to the left next to the object O is to be aimed at, as is illustrated by the target position, illustrated symbolically in the right-hand part in FIG. 5, of the vehicle in question EF and of the object O. In other words, in FIG. 5 the initial situation is dealt with both with respect to the combination "left-hand flashing indicator light set and object detected in the front left-hand sector" as well as with respect to the combination "left-hand flashing indicator light set and object detected in the front right-hand sector" wherein the direction arrow EPR illustrates the desired parking direction, and the object O is considered as the end of the parking space.

Figure 6:
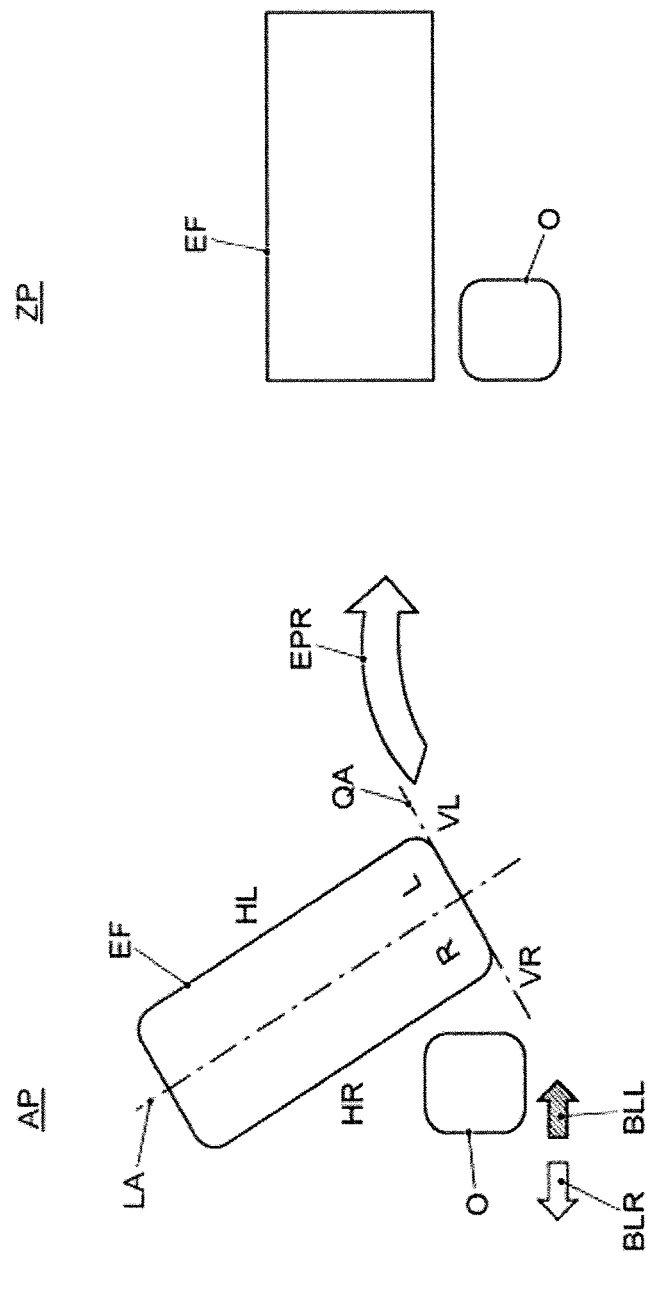
FIG. 6 shows the parking strategy for the combination of the left-hand flashing indicator light having been set and an object on the right and to the rear for a parking space without a start.

FIG. 6 shows the initial situation in which the detected object O is located in the rear right-hand sector HR and the left-hand flashing indicator light BLL is set. In other words, the object O is located on the right next to the vehicle in question EF and the parking direction EPR desired by the driver is to the right. In this context the object O is evaluated as the end of the parking space by the assistance system, and the vehicle in question EF is aligned to the left next to the object, as is illustrated as a target position ZP of the vehicle EF in the right-hand part of FIG. 6.

Figure 7:
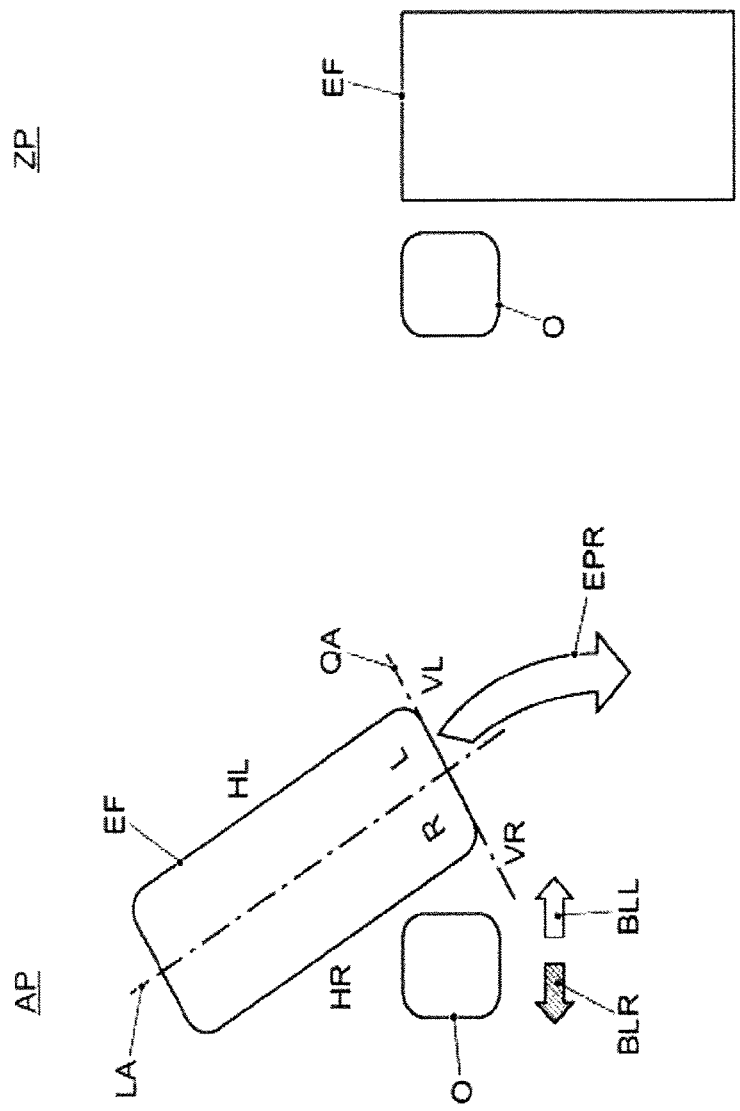
FIG. 7 shows the parking strategy for the combination of the right-hand flashing indicator light having been set and an object on the right and to the rear for a parking space without an end.
Figure 8:
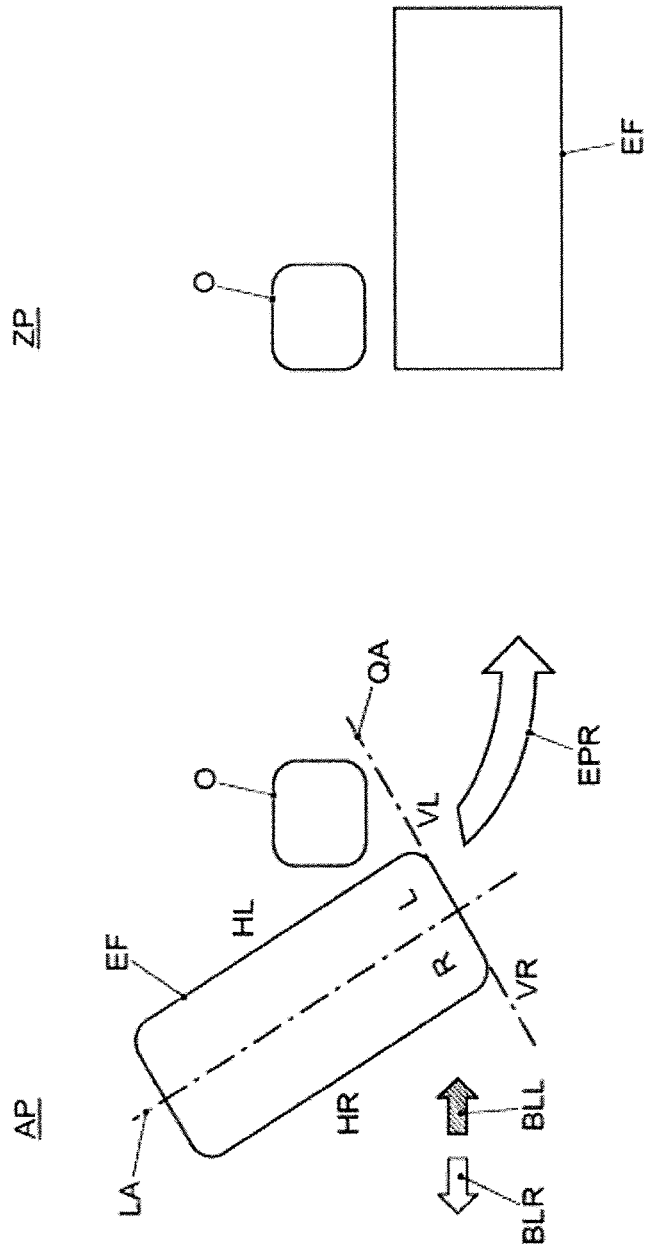
FIG. 8 shows the parking strategy for the combination of the left-hand flashing indicator light having been set and an object on the left and to the rear for a parking space without a start.

In FIGS. 7 and 8, examples are illustrated for the sector/flashing indicator light combinations in which it can initially be assumed that a parking space without an end is concerned, i.e. the detected object is evaluated as the start of a parking space. The examples are concerned with the combinations "left-hand flashing indicator light set and object to the rear on the left" as well as "right-hand flashing indicator light set and object to the rear on the right". The parking process is initially started "blind" and the vehicle attempts to position itself around the detected object. In the course of the parking process, if appropriate further objects are measured and the parking strategy is adapted to the current detected surroundings. The initial situation AP is also illustrated here in the left-hand part of the figures, and the aimed-at target position ZP in the right-hand part.

In FIG. 7, the detected object O is located exclusively in the rear right-hand sector HR of the vehicle in question EF, and the right-hand flashing indicator light BLR is set, as is illustrated in the left-hand part of FIG. 7 which shows the initial position. The object is consequently evaluated as the start of a parking space and the vehicle EF is to be aligned to the left next to the object O, as illustrated as a target position in the right-hand part of FIG. 7.

FIG. 8 shows in the left-hand part the initial situation when the parking process is initiated. Detected object O is located exclusively in the rear left-hand sector HL of the detection of the surroundings of the vehicle in question EF, and the left-hand flashing indicator light BLR is set. Consequently, the assistance system attempts to align the vehicle in question to the left of the object, as is illustrated symbolically in the right-hand part of FIG. 8 which illustrates the desired target position. The alignment and orientation of the vehicle in question occur in a situation-related fashion on the basis of the continuous detection of the surroundings. If plausible alignment and orientation are not possible the assisted parking process is aborted in a controlled fashion.

Competing combinations and their prioritization with respect to one another are dealt with reference to FIGS. 9 to 12, since it may be the case that the arrangement of the detected object in the sectors and the flashing indicator light position which is set does not lead to a clear strategy. In this case, rules have to be set up which lead to the selection of a clear parking strategy. The initial situation AP is also illustrated here in the left-hand part of the figures, and the aimed-at target position ZP in the right-hand part.

Figure 9:
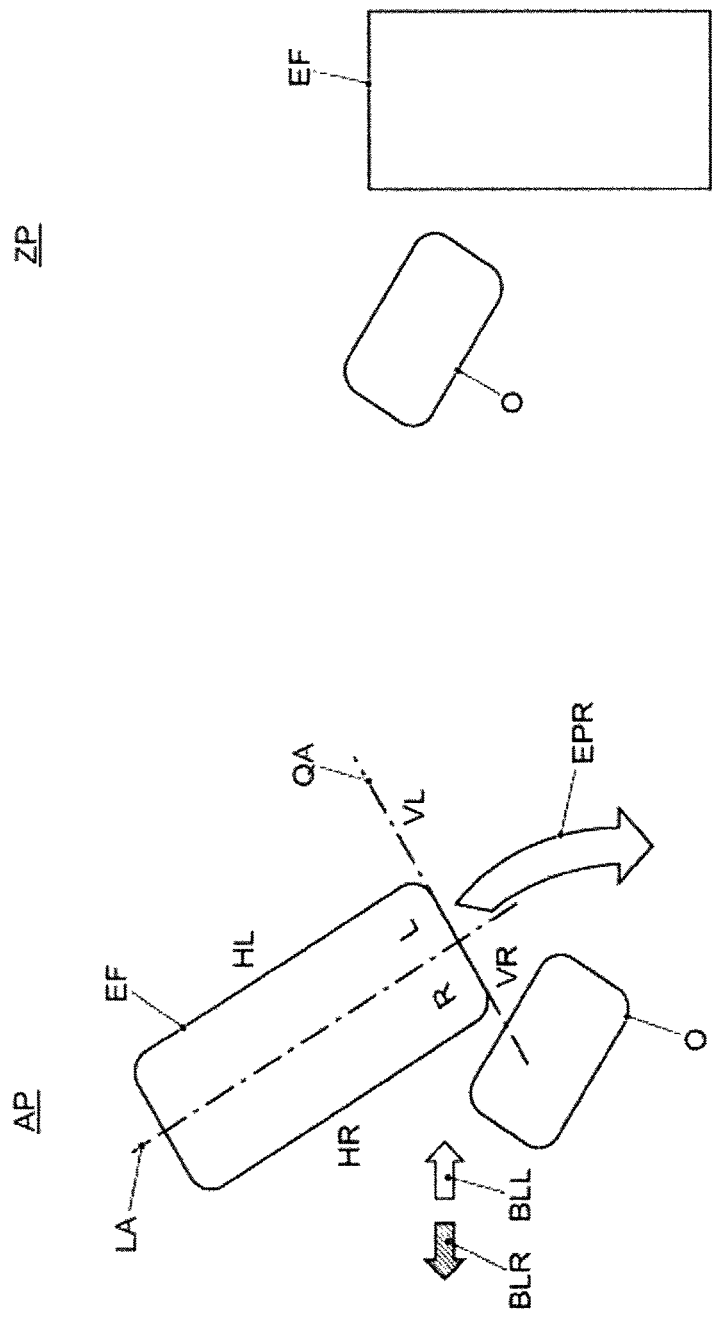
FIG. 9 shows a first example of prioritization between competing combinations.

The left-hand part of FIG. 9 illustrates the initial situation in which an object O is located both in the front right-hand sector VR and in the rear sector HR. In the example here, the flashing indicator light is set with the right-hand flashing indicator light BLR. This gives rise to the competing situation of the first combination of "object in the sector front right and right-hand flashing indicator light set", which is referred to as the first combination, and the combination "object in the sector rear right and right-hand flashing indicator light set", referred to as the second combination in the example in FIG. 9.

The first combination "object in the sector front right and right-hand flashing indicator light set" corresponds to the situation in FIG. 4, and the object O would be evaluated as the end of the parking space, with the result that the target position would be to the right next to the object O. The second combination "object in the sector rear right and right-hand flashing indicator light set" corresponds to the situation in FIG. 7 and the detected object O would be evaluated as the start of a parking space, with the result that the perpendicular parking space to the left of the object would have to be assumed. To resolve the conflict with respect to the target position, the second combination is prioritized over the first combination which leads to the target position, illustrated in the right-hand part of FIG. 9, of the vehicle in question EF, which corresponds to the target position in FIG. 7.

The left-hand part of FIG. 10 illustrates the initial situation in which an object O is located both in the front left-hand sector VL and in the rear left-hand right-hand sector HL. In the example in FIG. 10, the flashing indicator light is set here with the left-hand flashing indicator light BLL. This leads to the competing situation of the first combination "object in sector front left and left-hand flashing indicator light set", which is referred to as the first combination, and the combination "object in sector rear left and left-hand flashing indicator light set", which is referred to here as the second combination in the example in FIG. 10.

The first combination "object in sector front left and left-hand flashing indicator light set" corresponds to the situation in FIG. 5, and the object O would be evaluated as the end of a parking space, with the result that the target position would be to the right next to the object O. The second combination "object in sector rear left and left-hand flashing indicator light set" corresponds to the situation in FIG. 8, and the detected object O would be evaluated as the start of a parking space with the result that the perpendicular parking space to the left of the object would have to be assumed. To resolve the conflict with respect to the target position, the second combination is also prioritized here over the first combination which leads to the target position, illustrated in the right-hand part in FIG. 10, of the vehicle in question EF which corresponds to the target position in FIG. 8.

It has already been mentioned repeatedly that in the course of the parking process continuous measurement of the surroundings takes place and the assistance system reacts suitably to changed surroundings. In this case, the alignment and orientation of the vehicle in question occur in a situation-related fashion and are adapted continuously to changed conditions in the course of the parking process. However, plausible alignment and orientation of the parking vehicle is, for example, not possible when only one insufficiently deep object is available without orientation next to the vehicle. In other words, if the detected object by means of which the parking process was initiated is, for example, a lantern or the like and if no further object with which the vehicle can align itself is detected during the parking process, the parking process must be aborted in a controlled fashion. Such situations in which a parking process has to be aborted owing to a lack of orientation are presented by way of example in FIGS. 11 and 12.

Figure 11:
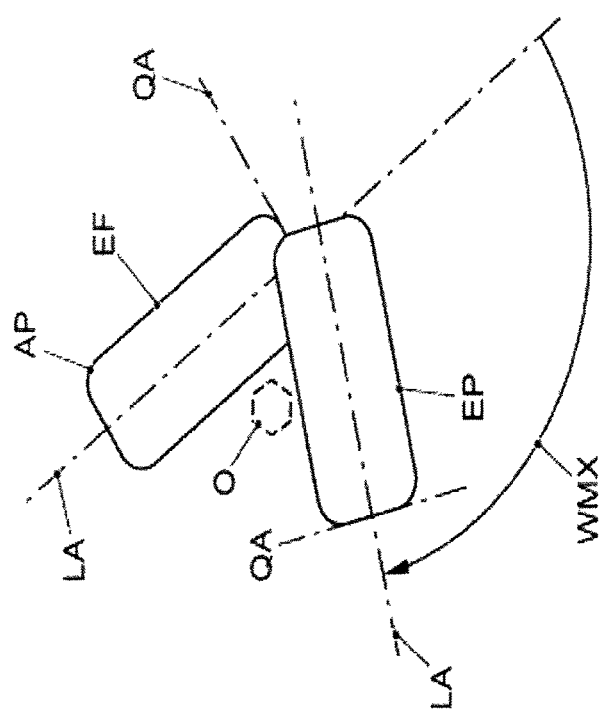
FIG. 11 shows the aborting of the parking process on the basis of a change in angle.

FIG. 11 shows the initial position AP of a vehicle in question EF next to an object O which, in accordance with the nonclamenture explained above, is located in the right-hand rear sector of the vehicle in question EF. If the right-hand flashing indicator light has been set, the intended parking process corresponds to that in FIG. 7. In the example in FIG. 11, the object O has a hexagonal shape, with the result that owing to its large number of edges it is not possible to detect an edge with which alignment of the parking process could take place. The vehicle EF would then attempt a parking process which could lead to the illustrated end position EP, still next to the object O. A condition for the aborting of the parking process is that the change in angle between the initial position AP and the current end position EP at which aborting takes place has reached a predefined maximum angle WMX. As long as the angle between the vehicle longitudinal axis of the initial position and that of the current end position is smaller than the maximum angle value, the search for a suitable parking position is continued. When the maximum angle value is reached or exceeded, aborting of the assisted parking process occurs and the driver assumes complete control of the vehicle. The value range of the change in angle can be 0° to 360°, and the increment of the change in angle caused by the assistance could be 10°, and in the case of a maximum angle WMX of 110° between the initial position AP and the current end position EP the parking process would be aborted.

Figure 12:
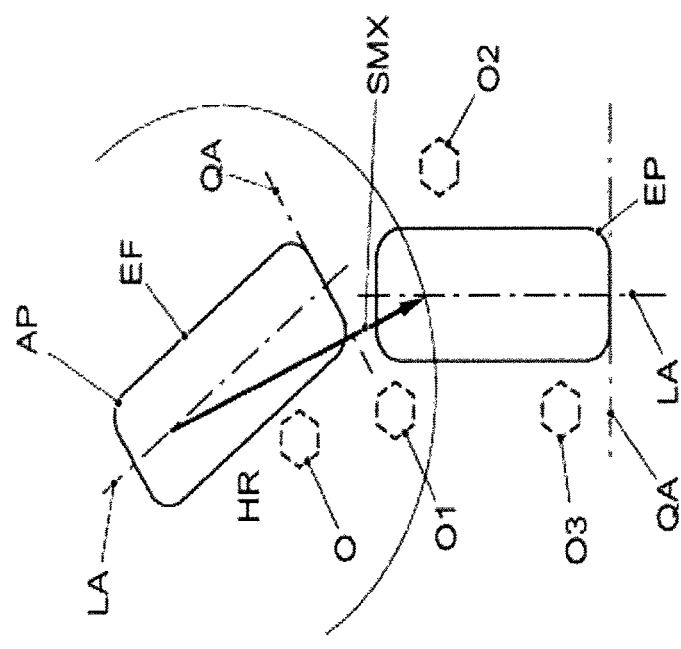
FIG. 12 shows the aborting of a parking process on the basis of the distance traveled.

FIG. 12 shows an example of aborting a parking process on the basis of the distance traveled by the vehicle during the parking process. FIG. 12 illustrates a vehicle in question EF in the initial position AP in which an object O is located in the rear right-hand sector HR. If the right-hand flashing indicator light is set this corresponds to the situation in FIG. 7 and the vehicle assumes the parking space to the left of the object O, and attempts a parking process there. For the sake of illustration, the object O is illustrated as a hexagon in FIG. 12, with the result that the object O does not provide any orientation during the parking process. In the course of the parking process, a further object O1 is detected which does not provide any orientation either. Subsequently, further objects O2 and O3 are detected by the detection of the surroundings of the vehicle in question EF, but the objects O2 and O3 likewise do not provide any orientation for aligning the vehicle in question on the basis of their geometric configurations or geometric dimensions. When a maximum distance SMX is reached, illustrated in FIG. 12, as a radius of a circle, the parking process is aborted. Optionally, the value range for the traveled distance is 0 to 10 m, the increment may be 0.3 m and the maximum distance SMX may be 6 m.

Figure 13:
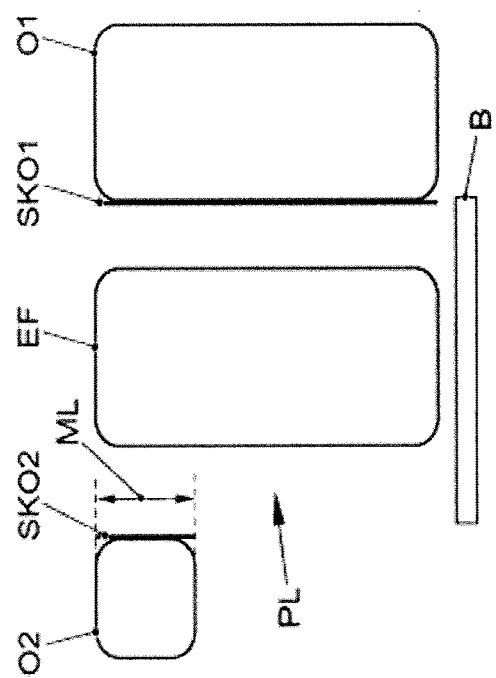
FIG. 13 shows a first example of possible orientations.
Figure 14:
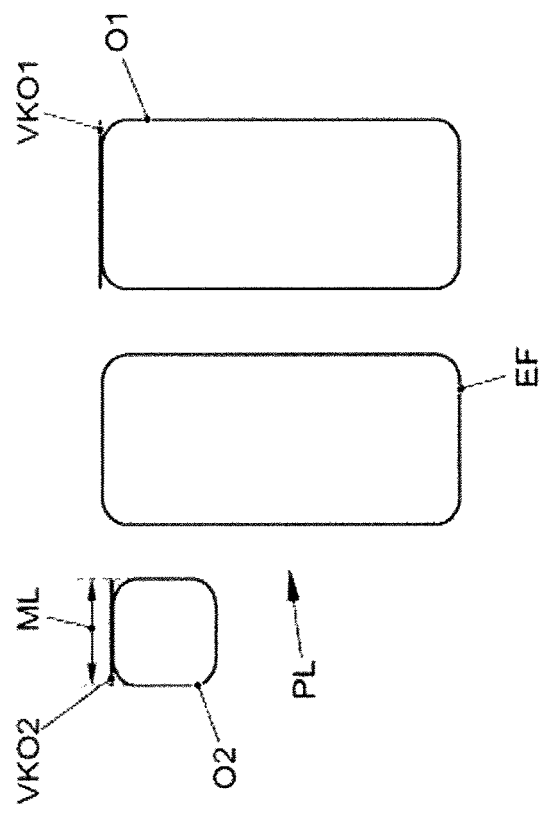
FIG. 14 shows a second example of possible orientations.
Figure 15:
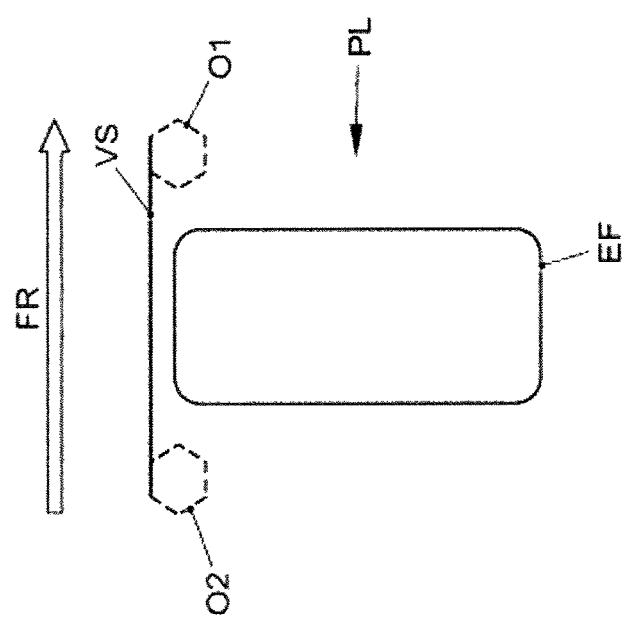
FIG. 15 shows a third example of possible orientations.

FIGS. 13 to 15 illustrate exemplary situations in the surroundings during the forward parking which provide orientations for the alignment of the vehicle to be parked. In this context, a distinction is made between FIG. 13 shows a vehicle in question EF in a perpendicular parking space PL after the parking process. The perpendicular parking space PL is enclosed here by a first deep object O1 and a second non-deep object O2. Possible orientations for the determination of the perpendicular parking space PL and for the alignment of the vehicle in question EF during the parking process provide:

a) the deep lateral edge SKO1 of the first deep object O1,
b) the non-deep lateral edge SKO2 of the second non-deep object O2 and
c) a boundary B of the perpendicular parking space PL in the depth.

It is to be noted that to be suitable as orientation for the parking process an edge such as, for example the lateral edge SKO2 of the second object O2 must have a predefined minimum length ML, and otherwise orientation with this edge SKO2 is not possible and this therefore provides no orientation for the assistance system.

FIG. 14 shows further possibilities for the alignment of the vehicle in question EF in a perpendicular parking space EF between two objects O1 and O2. The vehicle in question can be aligned d) at an angle of 90° with respect to the front edge VKO1 of the deep object O1, and
e) at an angle of 90° with respect to the front edge VKO2 of the non-deep object O2.

This means that the front edges VKO1 or VKO2 have a detectable minimum length ML.

FIG. 15 shows the case in which the vehicle in question EF has found a perpendicular parking space PL between two objects O1 and O2, wherein the two objects O1, O2 form the front boundary of the parking space PL but do not provide any reference points for orientation. This may be due to the geometric shape of the objects, as is the case in FIG. 15 owing to the hexagonal shape. In addition orientation with an edge is not possible if the edge is not sufficiently long.

Further possibilities for the alignment of the vehicle in question EF during the parking process are provided by the connecting line VS between the start of the parking space defined by the object O2 and the end of the parking space defined by the object O1, and by the direction FR of the travel past. The vehicle in question can therefore be aligned f) at 90° with respect to the connecting line VS and
g) at 90° with respect to the direction FR of the travel past.

FIGS. 13 to 15 describe various situations in the surroundings with which the progress of the parking process can be oriented and which are suitable for aligning the vehicle in question EF. During a parking process, a plurality of the described situations in the surroundings a) to g) can, as it were occur simultaneously. Therefore, priority control may be introduced between the situations in the surroundings, wherein, as is customary, a higher priority takes precedence over a lower priority. A suitable calculation rule, for example that identical priorities are calculated with identical proportions, can be defined for situations in the surroundings with identical priorities.

It is therefore possible to define, for example, that the following applies for the situations a), b), c), and f) in the surroundings:

Prio (a)>Prio (b)>Prio (c)>Prio (f).

The situations d), e) and g) of the surroundings are less clear, with the result that they can each be provided, for example, with a low but identical priority.

Parking methods of this type, in which the driver is assisted in parking by a driver assistance system require, to calculate a suitable parking trajectory, the geometry of the perpendicular parking space which is measured by corresponding surroundings detectors. In this context, a perpendicular parking space is usually measured while the vehicle travels past the perpendicular parking space, with the result that after the measurement the vehicle has to be reset again for the forward parking, which is difficult in contemporary traffic situations. On the other hand, a parking maneuver could be carried out in the reverse direction, but this can also lead to difficulties with the traffic behind.

Perpendicular parking spaces can be found, in particular, on marked parking spaces or along broad streets. To impede the following traffic as little as possible, to load the vehicle easily from the rear in parking spaces in shopping centers or to avoid disputes about a perpendicular parking space which has been found, in such situations the parking of a motor vehicle into a perpendicular space is usually carried out in the forward direction of travel. When parking into a perpendicular space in the forward direction is assisted the problem of measuring the perpendicular parking space arises.

Document DE 10 2008 004 633 A1 discloses a method and a device for detecting and measuring a parking space, wherein three-dimensional data of the surroundings of the vehicle are detected. In this context, objects in the surroundings of the vehicle are classified into objects which bound parking spaces and objects which do not bound parking spaces, with the result that a spatial area which is suitable for the vehicle as a parking space can be determined in the surroundings of the vehicle. This data about the spatial area which is suitable as a parking space is output to the driver or to a superordinate system. The outputting of the data is carried out before the vehicle travels past the suitable spatial area.

Document DE 10 2010 030 213 A1 describes a method for detecting a perpendicular parking space and for assisting the parking into the detected perpendicular parking space in the forward direction. In this context, after initial alignment of the vehicle with respect to a perpendicular parking space by the driver, edges and corners of the objects bounding the perpendicular parking space are detected. The start of the parking into the perpendicular parking space therefore initially takes place under the control of the driver. The parking system then detects a first corner of a vehicle bounding the parking space, and a second vehicle edge of a second vehicle bounding the driving space. On the basis of this, a driving maneuver is detected which corresponds to the forward parking into a perpendicular parking space. After the detection of the driving maneuver, an offer of assistance is made to the driver, according to which the driver assistance system assumes, after the driver has given his agreement, the control and steering of the vehicle on the basis of continuous measurements of the surroundings and calculation of the parking path based thereon.

Document DE 10 2010 040 591 A1 discloses a parking assistant for assisting a parking process of a motor vehicle, which parking assistant detects a multiplicity of parking spaces, makes a selection from the multiplicity of detected parking spaces on the basis of a convenience measure and assists the parking process into the parking space. The convenience measure comprises here at least one predetermined condition on the basis of which the detected parking spaces can be classified according to assumed driver acceptance.

Document DE 10 2009 039 084 A1 describes a method for assisting a driver of a motor vehicle during forward parking into a perpendicular parking space. In this context, the assistance comprises the fact that a parking trajectory which is to be traveled along semi-autonomously by the motor vehicle is determined by the assistance apparatus as a function of conditions of the surroundings detected by a sensor device of the vehicle. If the speed of the vehicle is reduced to below a threshold value, and if a corresponding steering angle occurs, the assistance system assumes a parking request by the driver and offers assistance. If surroundings sensors of the assistance system then detect, on the basis of parked vehicle bounding the perpendicular parking space that the vehicle in question is already partially located in a perpendicular parking space, the assistance system calculates a parking trajectory. However, it is a precondition that the assistance system has detected or can detect a perpendicular parking space, otherwise an assisted parking process cannot be carried out. To detect the perpendicular parking space, objects bounding the parking space, such as other parked vehicles or marks on the ground are therefore necessary.

The disadvantage of the known methods is that the perpendicular parking space, or the position thereof, has to be known before the start of the parking assistance, wherein the detection of perpendicular parking spaces is particularly difficult. The known methods are therefore often not able to ensure parking assistance, since no suitable perpendicular parking space has been determined.

LIST OF REFERENCE SYMBOLS

AP Initial position
B Boundary
BLR Right-hand flashing indicator light set
BLL Left-hand flashing indicator light set
EF Vehicle in question
EPR Parking direction
EP End position
FR Direction of travel
HL Sector rear left
HR Sector rear right
L Left-hand vehicle side
LA Longitudinal axis
ML Minimum length
O Object
O1 Object 1
O2 Object 2
O3 Object 3
PL Perpendicular parking space
PB Parking space width
PT Parking space depth
QA Transverse axis
R Right-hand vehicle side
SKO1 Lateral edge object O1
SKO2 Lateral edge object O2
SMX Maximum distance
VKO1 Front edge object O1
VKO2 Front edge object O2
VL Sector front left
VR Sector front right
VS Connecting line
WMX Maximum angle
X X-coordinate
Y Y-coordinate
ZP Target position

The invention claimed is:

1. A method for selecting a parking process of a motor vehicle to park into a perpendicular parking space, wherein the motor vehicle has a programmable computing device for detecting objects in its surroundings, the method comprising:
   detecting, with at least one sensor, an object in the surroundings of the motor vehicle;
   determining, with the programmable computing device, the position of the object in relation to the motor vehicle;
   classifying, with the programmable computing device, the position of the detected object within a plurality of sectors by determining within which sector of the plurality of sectors the detected object is located, wherein the plurality of sectors is defined by dividing a region of the surroundings of the motor vehicle into sectors;
   in response to at least a set flashing indicator light position, both determining, with the programmable computing device, one or more possible situation-related parking strategies and selecting, with the programmable computing device, a situation-related parking strategy from the one or more possible situation-related parking strategies as a function of a combination of the position of the object relative to the motor vehicle and the set flashing indicator light position, which is one of "left", "right" or "neutral";
   providing, with the programmable computing device, a priority control to select the situation-related parking strategy in response to determining the detected object is located in at least two of the plurality of sectors; and
   carrying out an assisted parking process based on a preset parking strategy provided that the flashing indicator light position being set to "neutral" when no flashing indicator light position has been set.

2. The method of claim 1, wherein the detected object is evaluated as a start or end of a perpendicular parking space as a function of the combination of the position of the object relative to the motor vehicle and the set flashing indicator light position.

3. The method of claim 1, wherein the programmable computing device is further configured to perform continuous detection of the surroundings with the at least one sensor during the execution of the parking process based on the selected situation-related parking strategy, and the parking process based on the selected situation-related parking strategy is adapted to the results of a current detection of the surroundings.

4. The method of claim 1, wherein the preset parking strategy is defined solely based on the position of the detected object relative to the motor vehicle.

5. The method of claim 1, further comprising determining, with a programmable computing device, whether a plausible alignment and orientation of the motor vehicle during the parking process is not possible and aborting the parking process in response to the determination that a plausible alignment and orientation of the motor vehicle during the parking process is not possible.

6. The method of claim 5, further comprising continuing, with the programmable computing device, the parking process to completion so long as at least one of a change in angle which is passed through by a motor vehicle longitudinal axis between a starting position and a current position during the parking process is less than a predefined maximum value, and a distance traveled between the starting position and the current position during the parking process is less than a predefined maximum value.

7. The method of claim 1, wherein the parking process is initiated without previous determination of the perpendicular parking space.

8. The method of claim 1, further comprising determining a plurality of possible situation-related parking strategies and selecting the situation-related parking strategy from the plurality of possible situation-related parking strategies as the function of the combination of the position of the object relative to the motor vehicle and the set flashing indicator light position.

9. The method of claim 1, wherein a plurality of possible orientations for a determination of a perpendicular parking space and an alignment of the motor vehicle are used for selecting the parking process for execution, wherein a calculation rule is used for the priority control to establish one orientation of the plurality of possible orientations takes higher precedence than a second orientation of the plurality of possible orientations.

10. A device configured to perform a selection of a parking process of a motor vehicle into a perpendicular parking space with detection of its surroundings, the device comprising:
    at least one sensor to detect an object in the surroundings of the motor vehicle;
    a flashing indicator light configured to be placed in a set flashing indicator light position, which is one of "left", "right" or "neutral";
    one or more non-transitory machine-readable media comprising a plurality of instructions stored thereon that in response to being executed by the device, cause the device to:
        classify the position of a detected object within a plurality of sectors based on a determination of which sector of the plurality of sectors in which the detected object is located;
        select a parking strategy as a function of a combination of a classified position of the detected object and the set flashing indicator light position; and
        carry out an assisted parking process based on a preset parking strategy provided that the flashing indicator light position being set to "neutral" when no flashing indicator light position has been set,
    wherein the plurality of sectors is defined by dividing a region of the surroundings of the motor vehicle into sectors, and
    wherein the device is further configured to provide a priority control to select a situation-related parking strategy in response to the determination the detected object is located in at least two of the plurality of sectors.

11. The device of claim 10, wherein the parking strategy continuously adapts to a current detection of the surroundings based on the continuous detection of the surroundings during the parking process based on the selected parking strategy.

12. The device of claim 10, wherein the detected object is evaluated as a start or end of a perpendicular parking space as a function of the combination of the position of the object relative to the motor vehicle and the set flashing indicator light position.

13. The device of claim 10, wherein the at least one sensor is configured to perform continuous detection of the surroundings during the execution of the parking process based on the selected parking strategy, and the parking process based on the selected parking strategy is adapted to the results of a current detection of the surroundings.

14. The device of claim 10, wherein the preset parking strategy is defined solely based on the position of the detected object relative to the motor vehicle.

15. The device of claim 10, wherein the device is further configured to determine whether a plausible alignment and orientation of the motor vehicle during the parking process is not possible and aborting the parking process in response to the determination that a plausible alignment and orientation of the motor vehicle during the parking process is not possible.

16. The device of claim 15, wherein the device is further configured to continue the parking process to completion so long as at least one of a change in angle which is passed through by a motor vehicle longitudinal axis between a starting position and a current position during the parking process is less than a predefined maximum value and a distance traveled between the starting position and the current position during the parking process is less than a predefined maximum value.

17. The device of claim 10, wherein the parking process is initiated without previous determination of the perpendicular parking space.

18. The device of claim 10, wherein the device is further configured to determine a plurality of possible parking strategies and select the parking strategy as the function of the combination of the classified position of the detected object and the set flashing indicator light position.

19. The device of claim 10, wherein a plurality of possible orientations for a determination of a perpendicular parking space and an alignment of the motor vehicle are used to select the parking process for execution, wherein a calculation rule is used for the priority control to establish one orientation of the plurality of possible orientations takes higher precedence than a second orientation of the plurality of possible orientations.

* * * * *